(12) United States Patent     (10) Patent No.: US 8,832,442 B2
Chen     (45) Date of Patent: Sep. 9, 2014

(54) METHOD AND DEVICE FOR SECURELY DISTRIBUTING DATA IN GROUP COMMUNICATION

(75) Inventor: Po-Fei Chen, Taipei (TW)

(73) Assignee: Panasonic Corporation, Osaka (JP)

( * ) Notice: Subject to any disclaimer, the term of this patent is extended or adjusted under 35 U.S.C. 154(b) by 1725 days.

(21) Appl. No.: 11/916,695

(22) PCT Filed: Jun. 15, 2006

(86) PCT No.: PCT/JP2006/312456
§ 371 (c)(1),
(2), (4) Date: Dec. 6, 2007

(87) PCT Pub. No.: WO2006/135102
PCT Pub. Date: Dec. 21, 2006

(65) Prior Publication Data
US 2009/0132822 A1     May 21, 2009

(30) Foreign Application Priority Data

Jun. 16, 2005 (CN) .......................... 2005 1 0078175

(51) Int. Cl.
*G06F 17/30* (2006.01)
*H04L 9/00* (2006.01)
*H04L 9/08* (2006.01)
*H04L 9/32* (2006.01)
*H04L 29/06* (2006.01)

(52) U.S. Cl.
CPC ........ *H04L 63/0428* (2013.01); *H04L 65/4038* (2013.01); *H04L 63/065* (2013.01); *H04L 63/104* (2013.01); *H04L 63/062* (2013.01); *H04L 29/06027* (2013.01)
USPC ............. 713/171; 380/44; 380/278; 380/283; 726/27

(58) Field of Classification Search
CPC ........ G06F 21/10; G06F 21/60; H04L 9/083; H04L 63/10; H04L 63/062
See application file for complete search history.

(56) References Cited

U.S. PATENT DOCUMENTS 6,260,142 B1    7/2001    Thakkar et al.
6,704,772 B1    3/2004    Ahmed et al.
(Continued)

FOREIGN PATENT DOCUMENTS

CN    1471016    1/2004
EP    1085444    3/2001

OTHER PUBLICATIONS

Wang Fen-hua et al., "Realization of Video NetMeeting System to LAN", Microcomputer Development 2004 No. 1, pp. 47-50.
(Continued)

*Primary Examiner* — Fatoumata Traore
(74) *Attorney, Agent, or Firm* — Greenblum & Bernstein, P.L.C.

(57) ABSTRACT

In a method for securely distributing data in group communication, the group has a plurality of members, and the method includes the following steps: (A) under a data recording mode, assigning one member of the group as a recording member; (B) enabling the recording member to generate and send a security key to other members of the group, to record communication contents of all the members during a group communication session, and to create an entry of recorded data therefor; and (C) enabling the other members of the group to receive and store the security key, the security key enabling the other members of the group to retrieve the recorded data from the recording member under a data retrieval mode.

24 Claims, 7 Drawing Sheets

(56) References Cited

U.S. PATENT DOCUMENTS

| | | | |
|---|---|---|---|
| 6,993,325 B1* | 1/2006 | Waesterlid | 455/414.1 |
| 7,046,993 B2* | 5/2006 | Haaramo et al. | 455/414.4 |
| 2002/0071529 A1 | 6/2002 | Nelkenbaum | |
| 2002/0085721 A1* | 7/2002 | Saneto et al. | 380/277 |
| 2003/0041136 A1* | 2/2003 | Cheline et al. | 709/223 |
| 2003/0110397 A1* | 6/2003 | Supramaniam et al. | 713/201 |
| 2003/0126464 A1* | 7/2003 | McDaniel et al. | 713/201 |
| 2004/0148359 A1 | 7/2004 | Ahmed et al. | |
| 2004/0219941 A1* | 11/2004 | Haaramo et al. | 455/519 |
| 2005/0202806 A1* | 9/2005 | Bourgeois et al. | 455/416 |
| 2006/0056427 A1 | 3/2006 | Sato | |
| 2006/0129806 A1* | 6/2006 | Walmsley | 713/161 |
| 2006/0129817 A1* | 6/2006 | Borneman et al. | 713/170 |
| 2006/0248149 A1* | 11/2006 | Kraft et al. | 709/206 |
| 2007/0133544 A1 | 6/2007 | Shida | |
| 2007/0183530 A1 | 8/2007 | Udagawa et al. | |

OTHER PUBLICATIONS

Feng Yong-Xin et al., "A Clustering Algorithm Applied to the Management of Mobile Ad Hoc Network", 2003 Journal of Software, pp. 132-333.

Zhu Wen-Tao et al., "A Study of the Key Distribution in Secure Multicast", 2003 Journal of Software, pp. 2052-2054.

* cited by examiner

METHOD AND DEVICE FOR SECURELY DISTRIBUTING DATA IN GROUP COMMUNICATION

TECHNICAL FIELD

The invention relates to a method for group communication, more particularly to method and device for securely distributing data in dynamic group communication.

BACKGROUND ART

Due to advances in communication services and their far-reaching convenience, services constructed on group communication, such as video conference, Internet protocol-based telephony, or chat room, are increasing gradually in popularity, and meanwhile, during group communication, the retention of records of communication data for future reference or as archives of important data is an important task.

Currently, there exist a number of methods. of recording data required in group communication, e.g., US Patent Publication No. 20020071529, which is directed to a method and system for multimedia network based data acquisition, recording and distribution. An embodiment in the aforesaid US Patent publication discloses an intelligent digital recording system, in which a group is used for call center including the data acquisition, recording and distribution.

However, said publication has its limitations in that: when the source of data comes from multiple devices, there must be a specific central service provider to monitor and to be responsible for the task of recording data. In addition, one drawback of said publication is that, during the process of recording and retrieving communications data, relevant security protection and preparation tasks are not available.

In view of the aforesaid limitations and drawback, said publication cannot be adapted for use in group communication recording tasks where a central service provider is not available, or a security protection function required during data recording and retrieval is missing, thereby resulting in possible interception or theft of the recorded data.

DISCLOSURE OF INVENTION

Therefore, an object of the present invention is to provide a method and device for securely distributing data with authentication in group communication required for various communications devices, such as a notebook computer, a personal digital assistant, an IP telephone, a mobile phone, etc., in an environment where recording tasks during group communication are conducted without being monitored by a central service provider.

Another object of the present invention is to provide a method and device for securely distributing data in group communication, which, during the process of group communication, take into account the security and privacy of data, and which adopt a protection policy of using cryptographic techniques to encrypt/decrypt communications data so as to prevent interception or theft of the data during the communication process.

The method for securely distributing data in group communication according to the present invention is adapted for use in a group having a plurality of members. The method comprises the following steps: (A) under a data recording mode, assigning one of the members of the group to be a recording member; (B) enabling the recording member to generate and send a security key to other members of the group, and to record communication contents of all the members during a group communication session so as to create an entry of recorded data; and (C) enabling the other members of the group to receive and store the security key, the security key being provided to enable the other members of the group to retrieve the recorded data from the recording member under a data retrieval mode.

A communications device for securely distributing data in group communication is adapted for use in a group. The group has a plurality of communications devices. Each of the communications devices includes a group communication unit, a network interface unit, a recording unit, a storage unit, a security unit, and a security recording unit.

The group communication unit is used for controlling the components in the communications device so as to coordinate operations of the communications device, and is capable of setting a group policy for the communications devices of other members, and assigning the communications device of one of the members of the group as a recording member. The network interface unit is electrically connected to the group communication unit such that the communications devices can transmit data to each other when the communications devices conduct a group communication session. The recording unit is electrically connected to the group communication unit, and when one or more of the members of the group is/are assigned as the recording member(s), under a data recording mode, the recording unit of the communications device of the recording member records communication contents of all the members during the group communication session and creates an entry of recorded data therefor. The storage unit is electrically connected to the recording unit for receiving and storing the recorded data from the recording unit therein. The security unit is electrically connected to the group communication unit such that when the member having the communications device is assigned to be the recording member, the security unit generates a security key which enables the communications devices of other members to retrieve the recorded data from the communications devices of the recording member under a data retrieval mode. The security recording unit records related data of the security key.

BRIEF DESCRIPTION OF DRAWINGS

Other features and advantages of the present invention will become apparent in the following detailed description of the preferred embodiment with reference to the accompanying drawings, of which.

BEST MODE FOR CARRYING OUT THE INVENTION

To facilitate description, an explanation of the meanings of the terms as used in this embodiment is given as follows. The term "group" refers to a group of "members" who can communicate with one another and can hear the communication contents of other members within a period of time. Each member of the group has a "mobile communications device". The mobile communications device has intercommunication and data recording functionality. "Recorded data" refers to communication contents within the period of communication, e.g., voice media data. "Group change" refers to the joining or leaving of members of the group. "Recording member" is a non-specific member of the group.

It is noted that, in other embodiments, the communication contents intended to be protected by the application of the concept of the present invention can be text files, voice, images or other multimedia data, and should not be limited to the voice media data proposed in this preferred embodiment.

Figure 1:
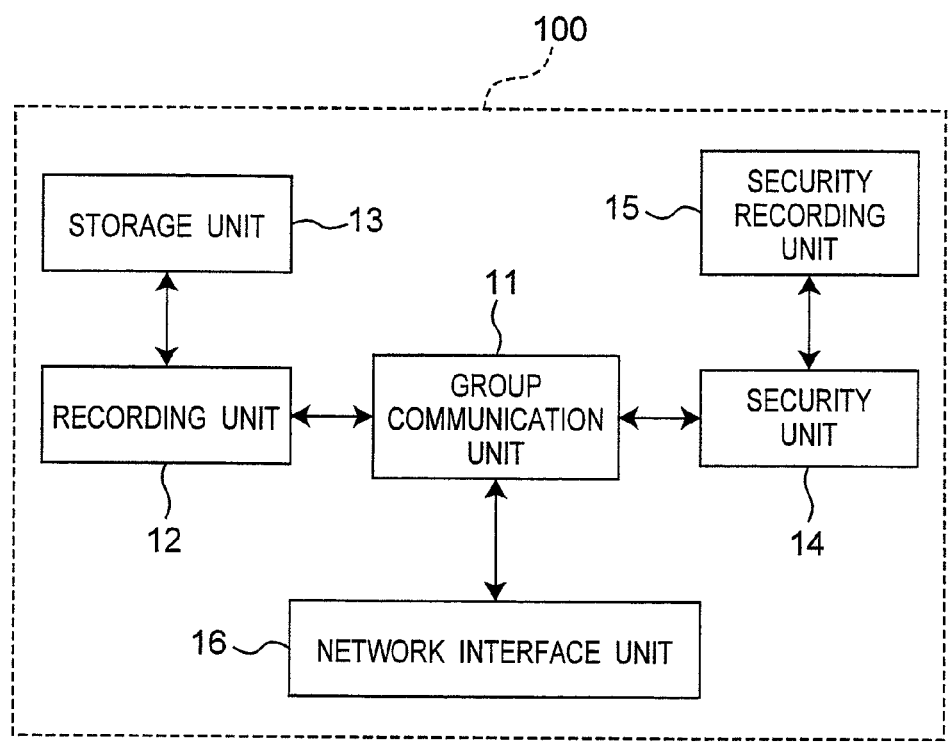
FIG. 1 is a system block diagram to illustrate a communications device for securely distributing data in group communication, and components of the communications device.

As shown in FIG. 1, the device for securely distributing data in group communication of the present invention is a communications device 100. In this embodiment, the communications device 100 may be an IP phone device or a mobile phone device. The communications device 100 includes a group communication unit 11, a recording unit 12, a storage unit 13, a security unit 14, a security recording unit 15, and a network interface unit 16.

The group communications unit 11 controls components 12-16 in the communications device 100 so as to coordinate operations related to group communication functions. The group communication unit 11 can set a common group communication policy with other members and assign one or more members of the group as the recording members based on the policy. The policy is to detect whether any member of the group has sufficient capability to be responsible for the recording task, such as having a sufficient storage space, being available to participate in the entire group communication session, or being available to participate in the session for the longest period of time among the members of the group since the assigned recording member is not necessarily available to participate in the entire session. Any member who meets the above condition can be assigned to take charge of the recording task.

The network interface unit 16 is electrically connected to the group communication unit 11, and is controlled by the group communication unit 11 such that when the communications devices 100 conduct a group communication session, the communications devices 100 can transmit data to one another through the network interface unit 16.

The recording unit 12 is electrically connected to the group communication unit 11. When a member having the communications device 100 is assigned to be the recording member, the communications device 100 of that member enters the data recording mode. Under the data recording mode, the group communication unit 11 instructs the recording unit 12 to record the contents of communication among the members during a group communication session and to create an entry of recorded data.

The storage unit 13 is electrically connected to the recording unit 12 to enable the recording unit 12 to store the recorded data therein.

The security unit 14 is electrically connected to the group communication unit 11. When the communications device 100 is assigned to be the recording member and enters the data recording mode, the group communication unit 11 will instruct the security unit 14 to generate a security key, which is sent to the communications devices 100 of other members of the group through the network interface unit 16, and allows other members of the group to retrieve the recorded data (to be described hereinafter) from the communications device 100 of the recording member under a data retrieval mode. In addition, encryption and decryption of the recorded data are also executed via the security unit 14.

Further, to ensure security, in the data recording mode, the group communication unit 11 will monitor changes in the members of the group through the network interface unit 16 such that when a new member joins the group or when a member leaves the group, the group communication unit 11 instructs the security unit 14 to generate a new security key, which is provided to the members of the group after the change through the network interface unit 16, and further instructs the recording unit 12 to record the subsequent communication contents of a group communication session as a new entry of recorded data. Therefore, once the group members change, the communications device 100 of the recording member will generate a new security key, and the subsequent communication contents will be recorded as a new entry of recorded data such that each entry of recorded data corresponds to a different security key.

The security recording unit 15 is provided for storing relevant security data of the security keys utilized by the security unit 14.

Under the data retrieval mode, a member can issue a request command through the group communication unit 11 of the communications device 100 to the communications device 100 of the recording member via the network interface unit 16 to request retrieval of the recorded data. The group communication unit 11 of the communications device 100 of the recording member can receive a request command issued by the communications devices 100 of the other members via the network interface unit 16 thereof, and decides retrieval of the recorded data according to the request.

When the communications device 100 of the recording member receives the request, the group communication unit 11 thereof will first require the member issuing the request to go through a predetermined authentication processing procedure to confirm his identity and access privilege, and then send back the recorded data desired to be retrieved.

The aforesaid identity authentication is achieved mainly through a network communications protocol that can verify that the other party indeed has the shared security key, for example, by using a challenge-response mechanism in which a string of plain text is first sent over as a challenge, and if the other party can use the shared security key to perform encryption or encoding processing of the text (e.g., in a keyed-hash) as a response, the challenging party can then verify the responding party's identity. As regards the access privilege, it means that only the user who passes the identity verification has the right to access the recorded data to which the security key corresponds. To enhance the security of the transmission of the recorded data, the group communication unit 11 will first instruct the security unit 14 to generate a new security key to encrypt the recorded data, and to send the new security key and the encrypted recorded data back to that member.

Further, changes in group members may also be due to the leaving of the communications device 100 of the recording member. Therefore, before the communications device 100 of the recording member leaves, the group communication unit 11 will notify the other members of the group in advance so that the communications devices 100 of the other members can assign one of the members in accordance with the common group communication policy to assume the role of the recording member.

Figure 2:
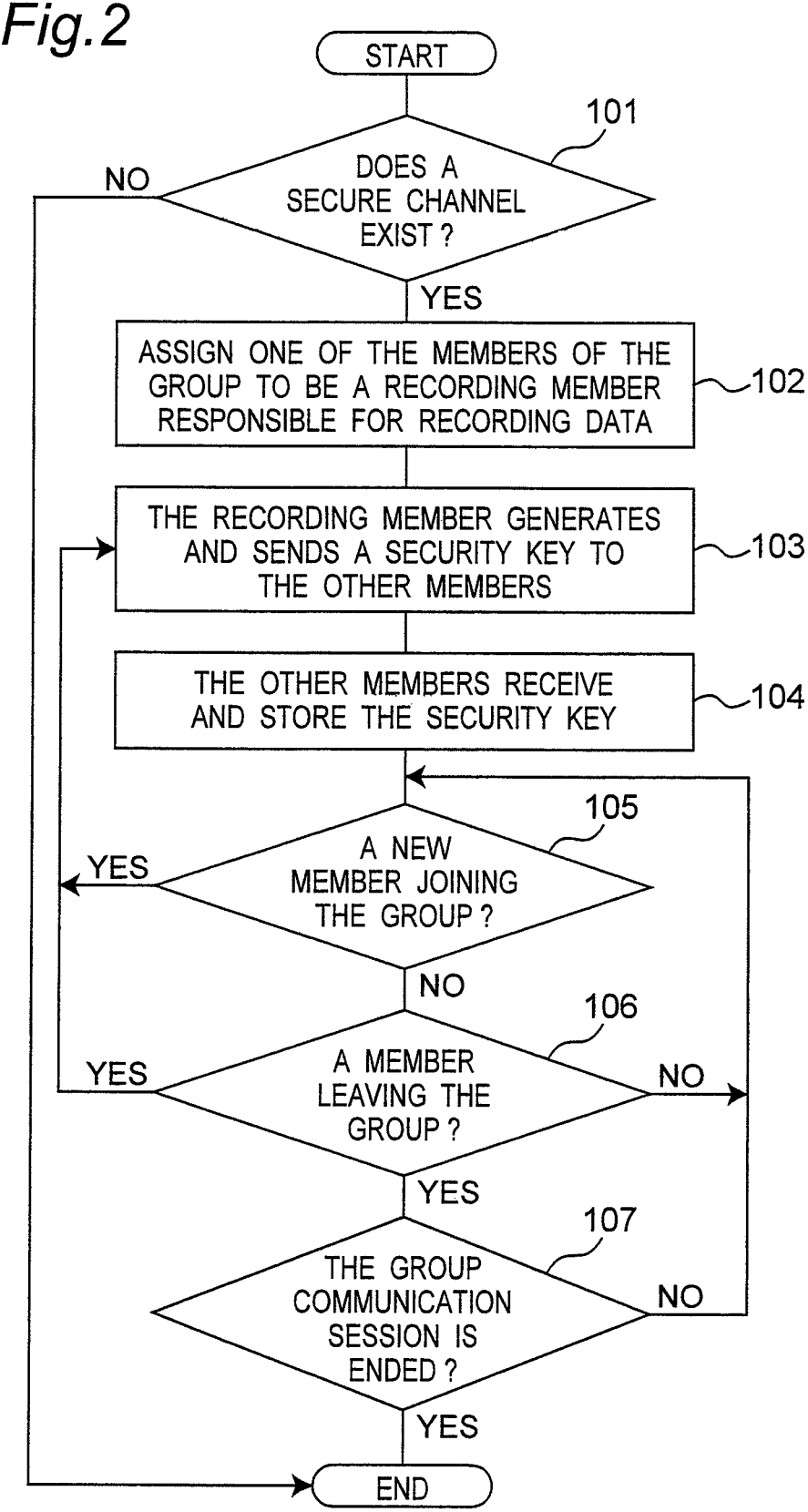
FIG. 2 is a flowchart to illustrate the steps of the preferred embodiment of a method for securely distributing data in group communication according to the present invention in the data recording mode.
Figure 6:
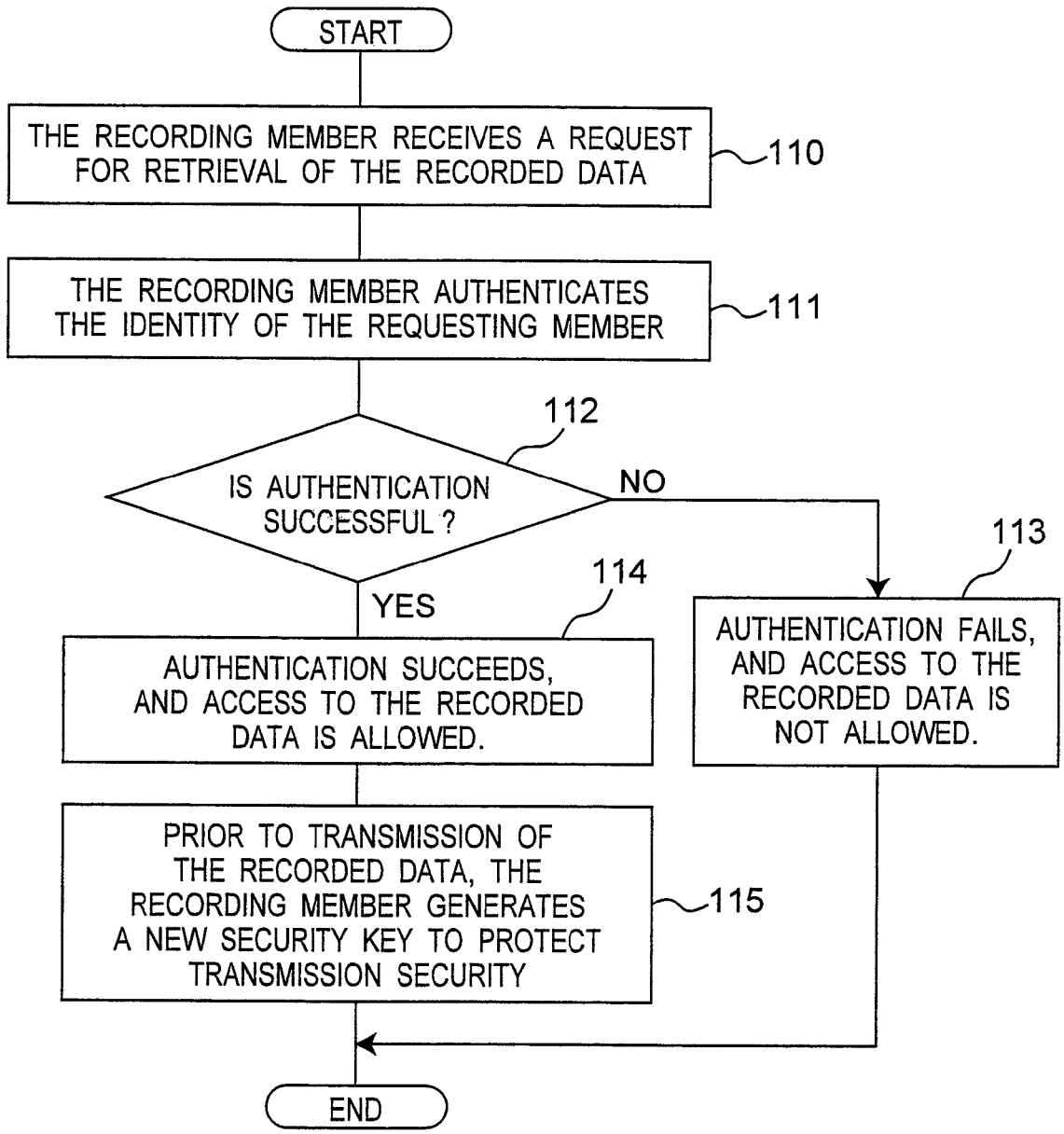
FIG. 6 is a flow diagram to illustrate the steps of the preferred embodiment in a data retrieval mode.
Figure 7:
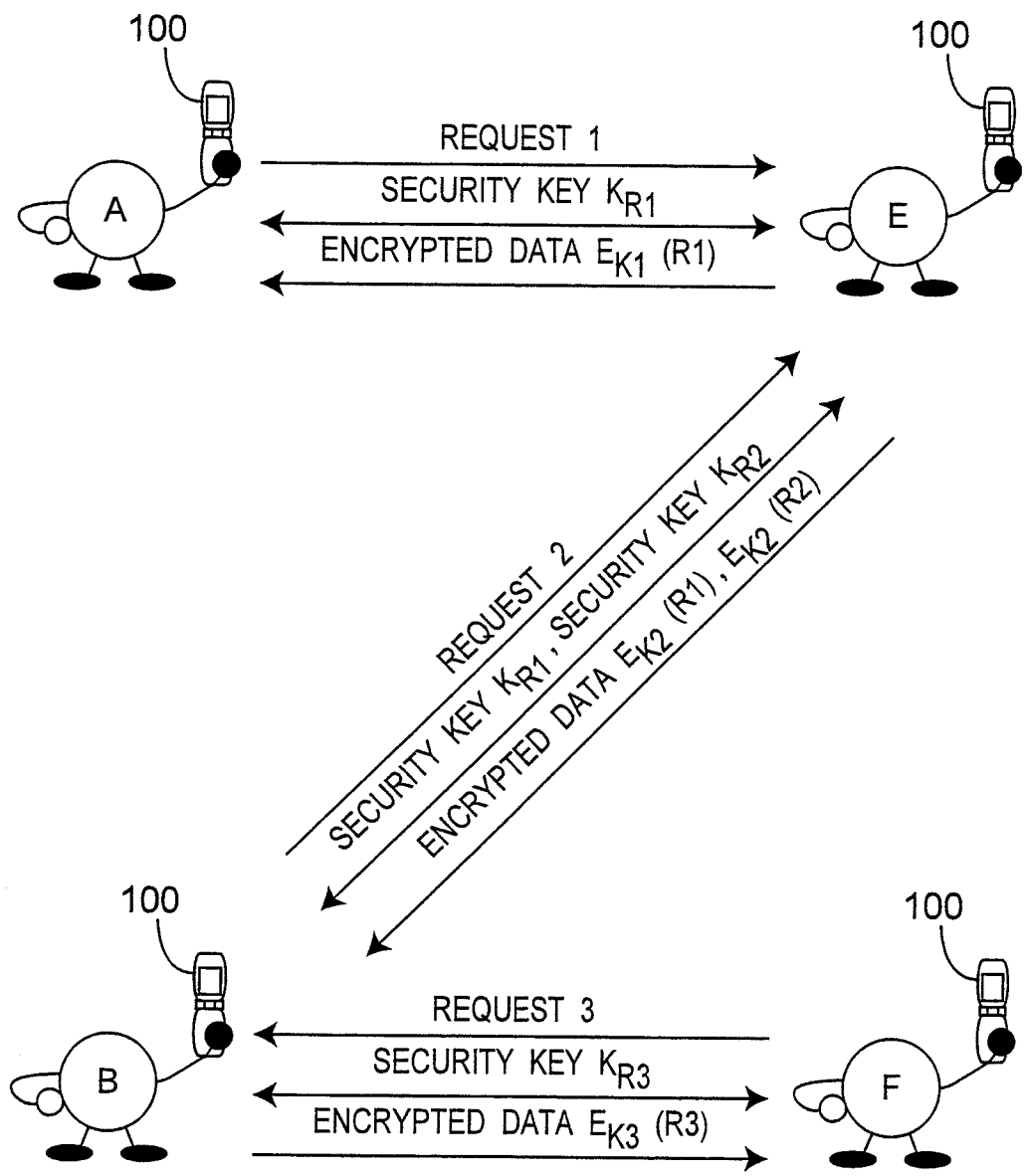
FIG. 7 is a flowchart to illustrate an example of data retrieval in the method for securely distributing data in group communication according to the present invention.

The method for securely distributing data in group communication according to the present invention includes two modes of use: data recording mode and data retrieval mode. FIG. 2 illustrates the flow of the data recording mode, and FIGS. 3, 4 and 5 respectively illustrate some usage examples of the data recording mode. FIG. 6 illustrates the flow of the data retrieval mode, and FIG. 7 illustrates a usage example of the data retrieval mode.

As shown in FIGS. 1 and 2, the method for securely distributing data in group communication in the data recording mode includes the following steps:

Step 101: Initially, when all the members are conducting a group communication session, it is determined whether a secure tunnel is present. If the secure tunnel is present, step 102 and subsequent steps are executed. Otherwise, relevant operations are terminated.

It is noted that the present invention utilizes an existing secure tunnel to transmit the key so as to achieve the object of security. The main purpose of establishing the secure tunnel is to protect the voice or multimedia transmitted over the network by encryption through, e.g., a cryptographic mechanism. As encryption is not the focus of this invention, it will not be described in detail herein for the sake of brevity.

Step 102: In the data recording mode, one member of the group is assigned to be the recording member responsible for the data recording task according to a group policy set by the group communication units 11 of the communications devices 100.

The principle of assigning the recording member is whether the member has the ability to take charge of the recording task, e.g., whether the member has sufficient storage space or will not leave in the middle of the group communication session.

Step 103: The recording member generates and sends a security key to other members of the group, and the security key is sent through the secure tunnel. The security unit 14 of the communications device 100 of the recording member generates the security key using an encryption algorithm for use in subsequent retrieval of recorded data. At the same time, the communications device 100 of the recording member will store the security key in the security storage unit 15, and instruct the recording unit 12 to record the communication contents during the group communication session so as to create an entry of recorded data for storage in the storage unit 13.

Step 104: The communications devices 100 of the other members of the group receive the security key, store the security key in the respective security recording units 15 of the members, and make a record as to which member of the group (i.e., the recording member) provided the security key. The security key is provided to enable other members of the group to retrieve the recorded data from the recording member in the data retrieval mode (to be described hereinafter).

Then, in case the communications device 100 of the recording member detects a group change, the recording unit 12 of the communications device 100 of the recording member records the group communication data after the change as a new entry of recorded data. Group changes are illustrated in steps 105 and 106. In this embodiment, a new member or a member who is leaving can inform all the members of the group directly or indirectly, and therefore, each communications device 100 of the group will receive a notification of such group change. Since techniques relating to notifications are not crucial features of the present invention, they will not be discussed in detail herein for the sake of brevity.

Step 105: A determination is made as to whether there is a new member joining the group communication session.

Step 106: A determination is made as to whether there is any member leaving in the middle of the group communication session.

Supposing there is a group change, i.e., the determination made in either step 105 or step 106 is positive, the communications device 100 of the recording member generates a new security key for the members who continue to participate in the group communication session, and records the group communication data as a new entry of recorded data, where the security key is used to correspondingly retrieve the new recorded data. Therefore, under the data retrieval mode, each member can only use the respective security key(s) he/she has to correspondingly retrieve the respective recorded data of the group communication sessions in which he/she had participated.

It is noted that, in the above process, the members conduct the group communication session in a secure tunnel through which the security key generated by the recording member is sent to the members participating in the group communication session.

Step 107: A determination is made as to whether the group communication session is ended. If it is determined that a termination condition is met, relevant actions are terminated. Otherwise, detection is continued to see if there is a change in membership.

In this embodiment, the condition for determining whether the group communication session is ended may be set to inspect whether there is only one member left. If there is only one member left, this indicates that the group communication session is over. Otherwise, the recording member still continues the data recording task. However, in other embodiments, the condition for determining the end of the group communication session may be an active or passive termination action, which will not be described further herein for the sake of brevity.

It is noted that the recording member may leave in the middle of the group communication session as well, and the group communication unit 11 of each communications device 100 can assign another member of the group as the recording member responsible for the data recording task according to the group policy set by the members.

The group communication applied in this embodiment may be a dynamic one, that is, all the members, including the member responsible for the recording task, may leave the group at any time. For instance, when the recording member is going to leave the group or when the capacity of the storage device thereof is going to be inadequate, the recording member will actively notify the other members of the group to assign another suitable member to take charge of the recording task.

Figure 3:
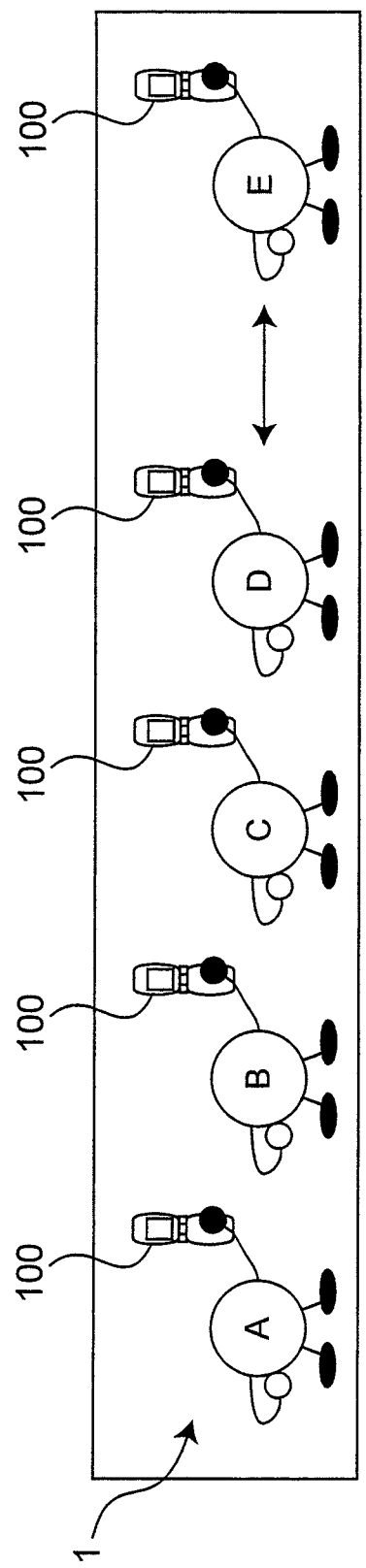
FIG. 3 is a schematic diagram to illustrate the preferred embodiment at the start of a group communication session under the data recording mode, in which the group has a plurality of members, and each member has a mobile communications device.

FIGS. 1 and 3 illustrate an example of the method for securely distributing data for recording and retrieval in group communication according to the present invention. In the example, it is assumed that, at the start of a group communication session, a group 1 has a plurality of members A, B, C, D, and E. Each of the members A, B, C, D, and E has a mobile communications device 100. Under the data recording mode, each mobile communications device 100 can assign the member E of the group 1 to be responsible for the data recording task according to a group policy set by the members. The recording member E then records an entry of recording data R1 of the group communication session in the storage unit 13 thereof.

At this time, the security unit 14 of the recording member E will generate a security key $K_{R1}$. At the same time, the recording member E will store the security key $K_{R1}$ in the security recording unit 15 thereof, and send the security key $K_{R1}$ to the security recording unit 15 of each of the members A, B, C, and D such that the security key $K_{R1}$ is stored in the security recording unit 15 of each of the members A, B, C, D, and E. In addition, the recording unit 12 of the recording member E will start recording the communication contents and create a new entry of recording data R1 for storage in the storage unit 13 thereof.

Figure 4:
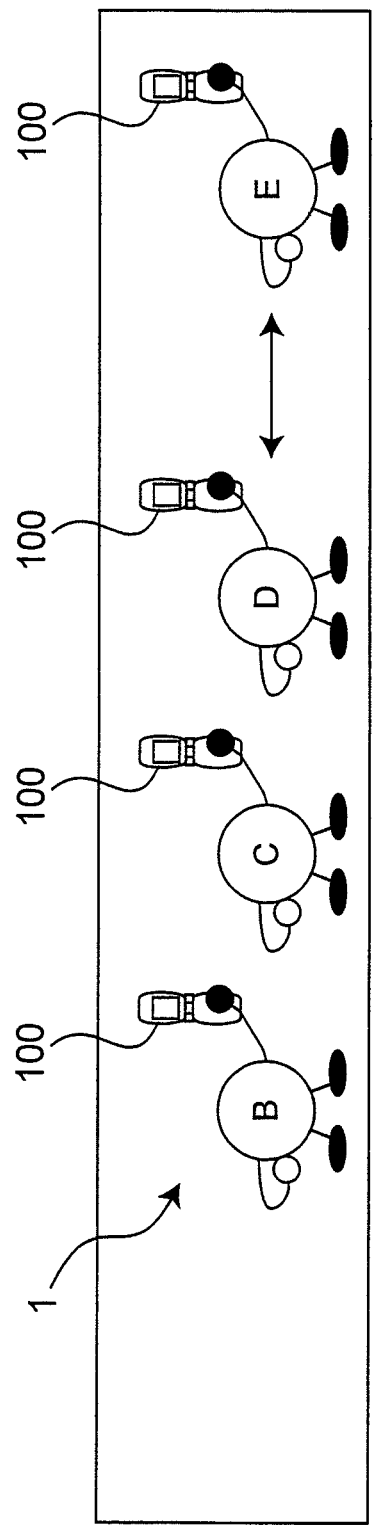
FIG. 4 is a schematic diagram to illustrate an example in which a member A of the group shown in FIG. 3 leaves the group communication session.

As shown in FIGS. 1 and 4, continuing the above example, supposing the member A leaves the group after the group communication session has proceeded for a period of time so that there are only members B, C, D, and E remaining in the group 1, the recording member E then generates a new security key $K_{R2}$ and causes the security key $K_{R2}$ to be stored in the security recording unit 15 of each of the members B, C, D, and E. In addition, the recording member E will record the communication contents after the change as a new entry of recorded data R2 for storage in the storage unit 13 thereof.

Hence, under the data retrieval mode, each of the members A, B, C, D, and E can only use the security key, or keys $K_{R1}$, $K_{R2}$ thereof to correspondingly retrieve the recorded data R1, R2 of communication in which he/she had participated, thereby achieving a security effect.

For example, the member A who joined the group communication session at the start but later left can only use the security key $K_{R1}$ to access the recorded data R1. Since the member A does not have the security key $K_{R2}$, he/she cannot access the later recorded data R2. Therefore, the recorded data R1, R2 stored by the recording member E can be accessed only by the members B, C, D and E who participated in the entire session.

Figure 5:
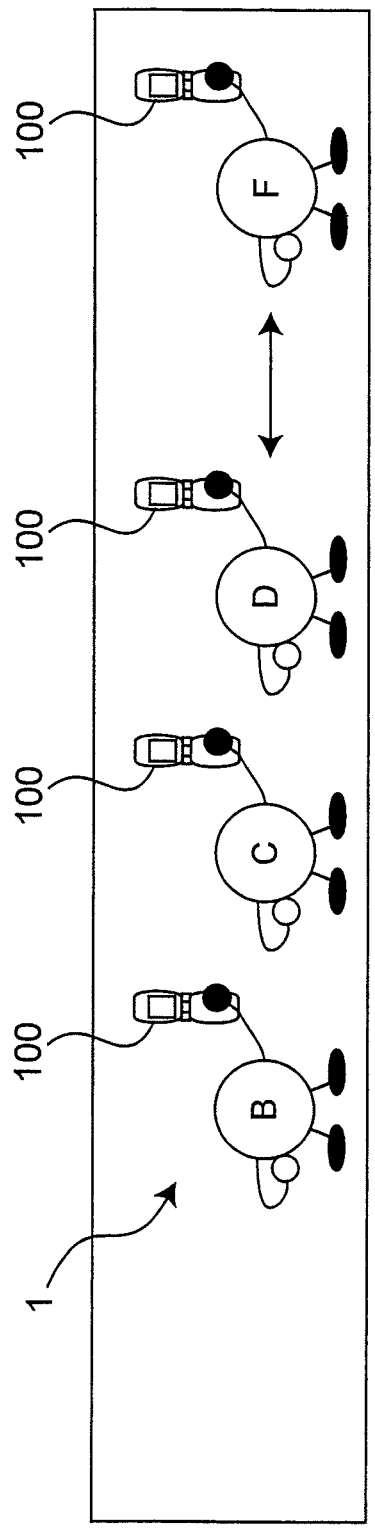
FIG. 5 is a schematic diagram to illustrate a scenario in which a member E of the group shown in FIG. 4 leaves the group while a member F joins the group communication session.

As shown in FIGS. 1 and 5, continuing the above example, supposing the recording member E of the group 1 leaves and a new member F joins the group 1 after the group communication session has proceeded for another period of time, if the member F is assigned to take charge of the data recording task, the recording member F will generate a new security key $K_{R3}$, cause the security key $K_{R3}$ to be stored in the security recording unit 15 of the members B, C, D, and F, and be responsible for recording a new entry of recorded data R3 of the group communication session in which he/she participated using the recording unit 12 for storage in the storage unit 13 thereof. Therefore, under the data retrieval mode, the members B, C, D and F holding the security key $K_{R3}$ can retrieve the recorded data R3 stored by the recording member F. This example illustrates the distributed recording architecture (data stored respectively in the storage units 13 of different members E, F) of the method according to the present invention. Therefore, the present invention also has advantages of distributed risks.

Referring to FIGS. 3 to 5, since a new security key is sent to the members participating in the group communication session every time the group membership changes, a member who participates in the group communication session all the way through will have many security keys. When that member wants to access the recorded data, he/she will use those security keys to access the recorded data of the group communication sessions in which he/she had participated.

Referring to FIG. 6, the steps executed by the recording member under the data retrieval mode in the method for securely distributing data in group communication according to the present invention are illustrated as follows.

Step 110: The recording member receives a request for retrieval of the recorded data. The request was issued by another member of the group.

Step 111: The recording member performs authentication of the identity of the member who issued the request so as to determine whether the member has the right to retrieve the recorded data. The authentication scheme is that the recording member demands to verify the security key of the member who issued the request, and compares the security key generated by the recording member in the data recording mode with that of the requesting member to determine if the security keys match for purposes of identity confirmation.

Step 112: A confirmation is made as to whether the authentication was successful. If the identity confirmation failed, step 113 is performed. Otherwise, step 114 is carried out.

Step 113: When the identity confirmation failed, the recording member does not allow the requesting member to access any recorded data.

Step 114: When the identity confirmation succeeded, the recording member allows the member who issued the request to access the recorded data.

Step 115: Prior to transmission of the recorded data, the recording member will generate a new security key to encrypt the recorded data, and then send the security key and the encrypted recorded data to the requesting member so as to enhance the security of data transmission. After the receipt of the encrypted recorded data, the requesting member can use the security key to decrypt the recorded data.

The generation of the security key as described above can be performed through an existing cryptographic key exchange protocol, which is primarily performed by the security unit 14 shown in FIG. 1. The timing for generating the security key is before the start of the transmission of the recorded data, and the actual decryption operation after the start of the transmission of the recorded data is also executed through the security unit 14.

Referring to FIG. 7, examples of data retrieval in the method for securely distributing data in group communication according to the present invention are illustrated in the following.

In example 1, the member A desiring to access the recorded data R1 stored by the recording member E first issues a request 1 to the recording member E, and uses the security key $K_{R1}$ as authentication. After receiving the request 1 from the member A, and after the request passes the authentication, the recording member E generates a security key K1 as the encryption/decryption key shared by both parties to protect transmission, that is, the recording member E uses the security key K1 in combination with an encryption equation $E_{K1}$ to encrypt the recorded data R1 into encrypted data $E_{K1}(R1)$ for sending to the member A, and the member A then uses the security key K1 to decrypt the encrypted data $E_{K1}(R1)$ to recover the original recorded data R1.

In example 2, the member B can access the recorded data R1, R2 stored by the recording member E, as well as access the recorded data R3 stored by the recording member F.

When the member B accesses the recorded data R1 and R2 stored by the recording member E, the member B first issues a request 2 to the recording member E, and uses the security keys $K_{R1}$ and $K_{R2}$ as authentication. After the receipt of the request 2 from the member B, and after the request passes authentication, the recording member E generates a security key K2 as the encryption/decryption key shared by both parties to protect transmission, that is, the recording member E uses the security key K2 in combination With an encryption equation $E_{K2}$ to encrypt the recorded data R1 and R2 into encrypted data $E_{K2}(R1)$, $E_{K2}(R2)$ for sending to the member B, and the member B can then use the security key K2 to decrypt the encrypted data $E_{K2}(R1)$, $E_{K2}(R2)$ to recover the original recorded data R1 and R2.

In the same manner, when the member B accesses the recorded data R3 stored by the recording member F, the recording member F uses a security key K3 in combination with an encryption equation $E_{K3}(R3)$ to encrypt the recorded data R3 into encrypted data $E_{K3}(R3)$ for sending to the member B. The member B can then use the security key K3 to decrypt the encrypted data $E_{K3}(R3)$ to recover the recorded data R3.

In sum, since conventional communication systems for recording data are mostly closed network architectures, where outsiders cannot easily intrude thereinto, there are less security concerns. However, in an open network architecture, the security during communication is an important issue to be considered.

In order to overcome the aforesaid drawbacks, in the method and device for securely distributing data in group communication according to the present invention, the data during group communication are recorded in a secure tunnel, and security keys required for authenticating the identity of members desiring to retrieve the data are prepared in advance of data retrieval. Moreover, during group communication, after the member desiring to retrieve the data has undergone identity authentication using his/her security key, another security key is generated to protect transmission security. Compared with conventional communication systems that are without any security mechanisms, the present invention can effectively overcome the problems associated with data security.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

Industrial Applicability

The present invention can be applied to method and device for securely distributing data in dynamic group communication.

The invention claimed is:

1. A method of securely distributing data in group communication, the group having a plurality of members, said method comprising:
    (A) forming a group having a variable plurality of members, each member of the group having a mobile communicator;
    (B) under a data recording mode, assigning one of the members of the group to be a recording member based upon a determination that the assigned one member of the group has a characteristic that satisfies a specified requirement set forth in a group communication policy common to all of the variable plurality of members of the group, wherein recording tasks performed by the mobile communicator of the assigned one member of the group are conducted during the group communication without being monitored by a central controller;
    (C) enabling the recording member to generate and send a security key to other members of the group, and to record communication contents of all the members during a group communication session in a memory of the mobile communicator of the recording member so as to create an entry of recorded data; and
    (D) enabling the other members of the group to receive and store the security key, the security key being provided to enable the other members of the group to retrieve the recorded data from the memory of the mobile communicator of the recording member under a data retrieval mode,
    wherein the members conduct the group communication session in a secure tunnel, and the security key generated by the recording member is sent to the other members of the group participating in the group communication session through the secure tunnel.

2. The method according to claim 1,
wherein the recording member also stores the security key.

3. The method according to claim 1,
wherein the recording member has storage space to record the communication contents of all the members of the group during the group communication session.

4. The method according to claim 1,
wherein the recording member participates in the group communication session for the longest period of time among all the members.

5. The method according to claim 1,
wherein the recording member generates the security key using an encryption algorithm for use in subsequent retrieval of the recorded data.

6. The method according to claim 1, further comprising:
    (E) upon detecting a group change, recording data of the group communication session after the group change as a new entry of recorded data.

7. The method according to claim 6, further comprising:
    (F) generating a new security key and sending the new security key to the members who continue to participate in the group communication session, the new security key permitting access to correspondingly retrieve the new entry of recorded data.

8. The method according to claim 7,
wherein, under the data retrieval mode, each member can only use the security key he/she has to correspondingly retrieve the recorded data of the group communication session in which he/she had participated.

9. The method according to claim 6,
wherein the detection of the group change in (E) includes the following:
    (E-1) detecting whether there is a new member joining the group communication session.

10. The method according to claim 6,
wherein the detection of the group change in (E) includes the following:
    (E-2) detecting whether there is any member leaving the group communication session.

11. The method according to claim 1, further comprising the following:
    (G) under the data retrieval mode, enabling other members of the group to request the recording member for retrieval of the recorded data; and
    (H) enabling the recording member to authenticate identity of the requesting member for determining whether said member has the right to retrieve the recorded data.

12. The method according to claim 11,
wherein the authentication in (H) is performed using the security key generated by the recording member under the data recording mode to confirm the identity of the requesting member.

13. The method according to claim 11, further comprising the following:

(I) when authentication of the identity fails, enabling the recording member to refuse to provide the recorded data to the requesting member.

14. The method according to claim 11, further comprising the following:
   (J) when authentication of the identity succeeds, enabling the recording member to allow the requesting member to retrieve the recorded data.

15. The method according to claim 14, further comprising the following:
   (K) prior to the transmission of the recorded data, generating a security key to protect the transmission of the recorded data.

16. A mobile communicator configured to be used in securely distributing data in group communication, the group having a plurality of members, each of the members having said mobile communicator, said mobile communicator comprising:
   a group communicator that controls components in said mobile communicator so as to coordinate operations relating to group communication functionality, and sets a group policy for the mobile communicators of other members and assigns the mobile communicator of one of the members of the group as a recording member based upon a determination that the assigned one member of the group has a characteristic that satisfies a specified requirement set forth in a group communication policy common to all of the variable plurality of members of the group,
   wherein recording tasks performed by the mobile communicator of the assigned one member of the group are conducted during the group communication without being monitored by a central controller;
   a network interface electrically connected to said group communicator such that said mobile communicator transmits data to and from the other mobile communicators in the group when the mobile communicators are conducting a group communication session;
   a recorder electrically connected to said group communicator such that when one of the members is assigned to be the recording member, said recorder of said mobile communicator of the recording member records communications contents of all the members during the group communication session under a data recording mode and creating an entry of recorded data therefor;
   a storage electrically connected to said recorder that receives and stores the recorded data from said recorder;
   a security generator electrically connected to said group communicator such that when a member having said mobile communicator is assigned to be the recording member, said security generator generates a security key, the security key being provided to enable said mobile communicators of the members to retrieve the recorded data from said mobile communicators of other members under a data retrieval mode; and
   a security recorder that records related data of the security key,
   wherein the members conduct the group communication session in a secure tunnel, and the security key generated by the recording member is sent to the other members of the group participating in the group communication session through the secure tunnel.

17. The mobile communicator according to claim 16, wherein said group communicator issues a request command via said network interface to said mobile communicator of the recording member to request access to the recorded data, and receives via said network interface the request command issued by said mobile communicators of other members for deciding whether or not to enable said mobile communicators of other members to access the recorded data in said storage.

18. The mobile communicator according to claim 16, wherein said group communicator monitors changes in the members of the group participating in the group communication session through said network interface.

19. The mobile communicator according to claim 18, wherein when said group communicator detects joining or leaving of a member, said group communicator instructs said security generator to generate a new security key to be provided to said mobile communicators of the other members of the group after the change through said network interface.

20. The mobile communicator according to claim 19, wherein said group communicator instructs said recorder to stop recording the recorded data before the change, and to record communication contents of the group communication session after the change as a new entry of recorded data.

21. The mobile communicator according to claim 16, wherein said mobile communicator is an IP telephone.

22. The mobile communicator according to claim 16, wherein said mobile communicator is a mobile phone.

23. A method of securely distributing data in group communication, the group having a plurality of members, said method comprising the following:
   (A) forming a group having a variable plurality of members, each member of the group having a mobile communicator;
   (B) under a data recording mode, assigning one of the members of the group as a recording member based upon a determination that the assigned one member of the group has a characteristic that satisfies a specified requirement set forth in a group communication policy common to all of the variable plurality of members of the group, wherein recording tasks performed by the mobile communicator of the assigned one member of the group are conducted during the group communication without being monitored by a central controller; and
   (C) enabling the recording member to generate and send a security key to other members of the group, the recording member recording communication contents of all the members during a group communication session in a memory of the mobile communicator of the recording member and creating an entry of recorded data therefor,
   wherein the members conduct the group communication session in a secure tunnel, and the security key generated by the recording member is sent to the other members of the group participating in the group communication session through the secure tunnel.

24. A method of securely distributing data in group communication, the group having a plurality of members, said method comprising the following:
   (A) forming a group having a variable plurality of members, each member of the group having a mobile communicator;
   (B) under a data retrieval mode, enabling the members of the group to send a predetermined security key to a recording member of the group who has an entry of recorded data based upon a determination that the recording member is an assigned one member of the group that has a characteristic that satisfies a specified requirement set forth in a group communication policy common to all of the variable plurality of members of the group, wherein recording tasks performed by the mobile communicator of the assigned one member of the group are conducted during the group communication without being monitored by a central controller;

(C) enabling the recording member to authenticate the security key and to allow members to retrieve the recorded data from a memory of the mobile communicator of the recording member when the security key passes the authentication;

(D) upon detecting a group change, recording data of the group communication session after the group chance as a new entry of data; and (E) generating a new security key and sending the new security key to the members who continue to participate in the group communication session, the new security key permitting access to correspondingly retrieve the new entry of recorded data, wherein, under the data retrieval mode, each member can only use the security key he/she has to correspondingly retrieve the recorded data of the group communication session in which he/she had participated.

* * * * *